Oct. 10, 1944.  W. H. LEWIS  2,360,065
APPARATUS FOR SEPARATING SLAG
Filed Aug. 5, 1942  2 Sheets-Sheet 1
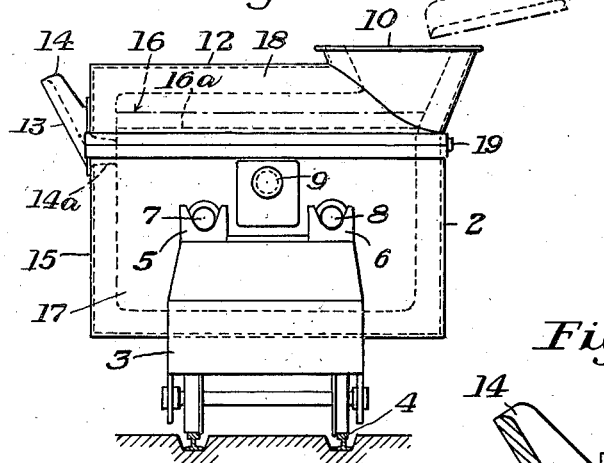
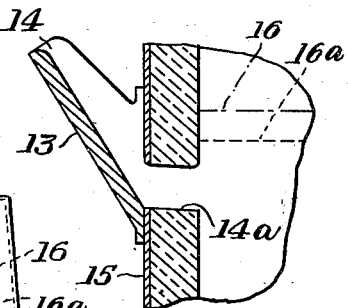
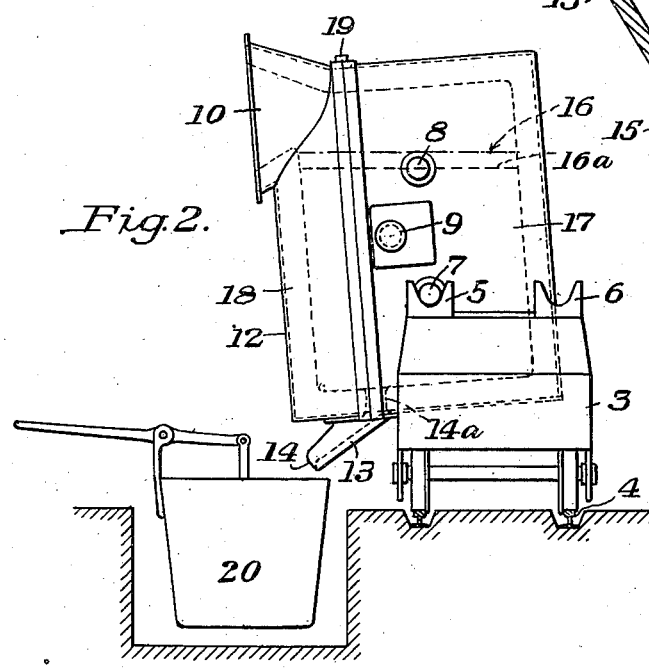
INVENTOR
William H. Lewis
by his attorneys
Stebbins and Blenko Oct. 10, 1944. W. H. LEWIS 2,360,065
APPARATUS FOR SEPARATING SLAG
Filed Aug. 5, 1942 2 Sheets-Sheet 2
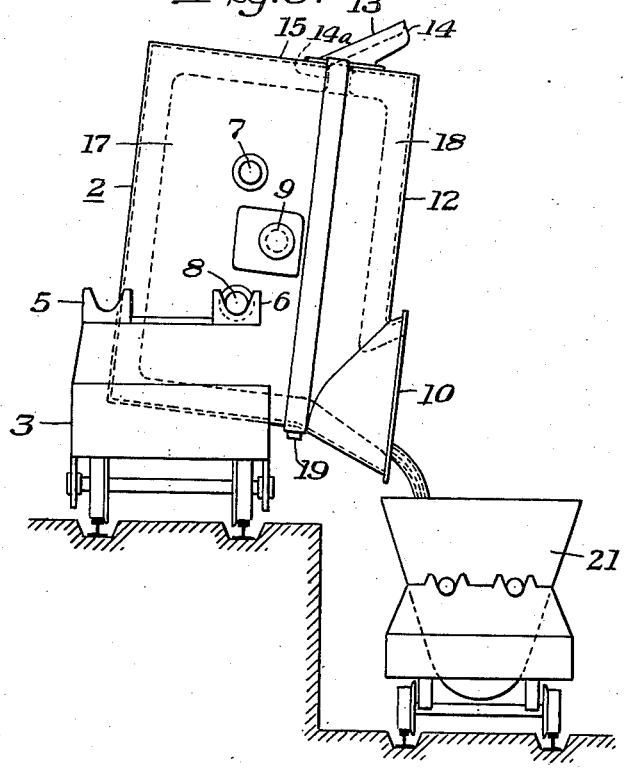
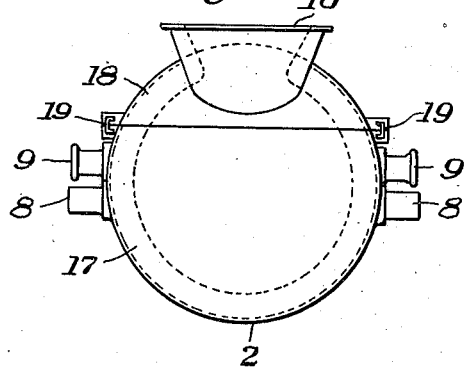
INVENTOR
William H Lewis
by his attorneys
Stebbins and Blenko Patented Oct. 10, 1944

2,360,065

UNITED STATES PATENT OFFICE 2,360,065

APPARATUS FOR SEPARATING SLAG

William H. Lewis, Pittsburgh, Pa.

Application August 5, 1942, Serial No. 453,627

4 Claims. (Cl. 266—37)

This invention relates to method and apparatus for separating molten slag and metal. It is very important in many metallurgical operations to separate slag from molten metal, as, for example, the separation of slag from molten iron going into the mixer prior to being supplied to an open hearth furnace. Another illustration is the separation of slag from iron blown in a Bessemer converter, especially where the blown metal is to be delivered to an open hearth furnace. In processes where steel has been dephosphorized or desulphurized, it is necessary to separate the slag from the metal after treating it with dephosphorizing or desulphurizing agents.

Slag can be separated from metal by pouring the slag and metal into a bottom pour ladle having a stoppered opening, discharging the metal from the ladle through the stoppered opening and closing the opening with the stopper before the slag begins to flow from the opening. This procedure, however, requires the use of a ladle provided with a stopper, which is objectionable, due not only to the cost of the stoppers but also because of the tendency of the stoppers to stick at times.

The present invention provides a non-stoppered bottom pour slag separating ladle which is mounted for tilting in opposite directions from its normal substantially horizontal position, in which it receives molten metal and slag, to two substantially vertical positions, in one of which metal is discharged and in the other of which slag is discharged. The ladle has a receiving opening and a metal discharge opening, both of which are located above the slag line when the ladle is in receiving position. The receiving opening and discharge opening are so arranged that in one vertical position the metal is discharged from the portion of the ladle which is farthest away from the slag line, and in the other vertical position the slag is discharged. The ladle is closed, except for the receiving and metal discharge openings, thereby retaining the heat of the molten metal and slag. The metal discharge opening does not require the use of a stopper.

In the accompanying drawings, which illustrate in a somewhat diagrammatic manner a preferred embodiment of the invention, Fig. 1 is a front elevation showing the slag separating ladle in its normal substantially horizontal position, in which it receives molten slag and metal;

Fig. 1a is a sectional view through the pouring nozzle and a portion of an end wall of the ladle illustrating the construction of the nozzle, the nozzle discharge opening and the nozzle entrance opening;

Fig. 2 is a front elevation showing the ladle in the substantially vertical position, in which the molten metal is being discharged from the bottom of the slag separating ladle into a casting ladle;

Fig. 3 is a front elevation showing the ladle in another vertical position, in which the slag is being discharged into a slag car; and Fig. 4 is an end elevation of the ladle shown in Fig. 1.

Referring more particularly to the accompanying drawings, a slag separating ladle 2 is tiltably mounted on a slag car 3 running on tracks 4. The slag car is provided with two bearings 5 and 6 which receive respectively the trunnions 7 and 8 extending from the sides of the ladle. The ladle also is provided with a lifting trunnion 9 adapted to be engaged by the hooks of a crane, in order to place the ladle on the slag car, remove it therefrom and to tilt it to the two vertical positions illustrated in Figs. 2 and 3.

The ladle 2 is preferably cylindrical in cross-section, as illustrated in Fig. 4, but it may be of any desired cross-section such, for example, as square or rectangular. It is provided with a receiving opening 10 in the top of the ladle by means of which molten metal and slag are introduced into the ladle from a runner 11. The top 12 of the ladle is closed, except for the receiving opening. The ladle has a metal discharge nozzle 13 at the end 15 of the ladle, the nozzle extending upwardly and being spaced away from the ladle. The nozzle 13 at its upward end has a nozzle discharge opening 14 which is above the slag line 16. The nozzle 13 at its lower end has a nozzle entrance opening 14a which is entirely below the slag metal line 16a.

The ladle is made in two parts, a lower part 17 and an upper part 18 keyed together by keys 19, so that the upper part may be removed after the keys are withdrawn, in order to remove skulls from the lower part of the ladle.

In carrying out the operation of separating slag from metal, the slag and metal are introduced into the ladle from the runner 11 while the ladle is in its horizontal position shown in Fig. 1. Since the nozzle discharge opening 14 is located above the slag line 16, neither metal nor slag can run out of the ladle, even though no stopper is used for closing the discharge opening. The ladle is then tilted to the vertical position, as shown in Fig. 2. This tilting may be done by means of a crane having hooks which engage the trunnions 9 or by any other suitable means. When the ladle is in this position, it is supported by the trunnion 7 and bearing 5. The metal is discharged through the opening 14a and nozzle 13 into a casting ladle 20 or into a mixer, open hearth furnace or converter. The receiving opening 10 is located above the slag line, so that slag does not run out during pouring of the metal. It will be noted that in the metal discharge position, shown in Fig. 2, the pouring nozzle 13 is at the bottom of the ladle so that the pouring operation may be characterized as a true bottom pour operation. In other words, the metal discharge opening is in that portion of the ladle which is farthest away from the slag line 16. The method of separating molten slag and metal is therefore applicable even though the slag is very fluid such as is the case after a desulphurizing operation in which soda ash has been used. In the present method there is no danger of slag running out of the metal discharge opening 14a with the metal because the discharge opening is spaced from the slag by the full height of the molten metal. If the metal discharge opening was located near to, although below, the slag line there would be danger of slag running out with the metal, particularly in those cases where the slag is very fluid. Where, however, as in the present invention, a true bottom pouring is obtained there is substantially no tendency for the slag to run out with the metal and a very good separation of slag and metal can be obtained.

In tilting the ladle from the receiving position, shown in Fig. 1, to the metal discharge position, shown in Fig. 2, the ladle is tilted rather rapidly although of course not so rapidly as to cause the slag to splash out of the receiving opening 10. If the ladle were tilted very slowly from the receiving position to the metal discharge position there would be a tendency for the slag to run out with the metal during the slow tilting because the metal discharge opening 14a would remain only a small distance below the slag line. However, where the ladle is rapidly tilted to the position shown in Fig. 2, the metal discharge opening 14a attains a position farthest away from the slag line in a short interval so that from that time on in pouring the metal the discharge opening is spaced away from the slag line by the full height of the molten metal whereby there is little, if any, tendency for slag to flow out of the metal discharge opening during pouring of the metal.

After the metal has been poured and as soon as slag begins to appear at the pouring nozzle 13, the ladle is tilted to the other vertical position, as shown in Fig. 3, in which the ladle is supported by the trunnion 8 and bearing 6. In this position, slag is discharged into the slag car 21 through the receiving opening 10.

Reference is made in the claims to a slag separating ladle mounted for tilting in opposite directions from its normal substantially horizontal position for receiving metal and slag to two substantially vertical positions, in one of which metal is discharged and in the other of which slag is discharged. It should be understood that the ladle need not be exactly horizontal or exactly vertical but may be tilted somewhat from a true horizontal position when receiving metal and slag and may be tilted somewhat from a true vertical position when discharging either metal or slag. In fact, the positions of the ladle shown in Figs. 2 and 3 are not truly vertical but are inclined somewhat to the vertical.

The invention is not limited to the preferred embodiment but may be otherwise embodied or practiced within the scope of the following claims.

I claim:

1. A slag separating ladle having a wall forming a solid bottom, said ladle comprising a body portion having two opposite ends, the ladle being mounted for tilting in opposite directions from its normal substantially horizontal position for receiving metal and slag to two substantially vertical opposite positions, in one of which metal is discharged and in the other of which slag is discharged, the top of the ladle being closed except for a receiving opening, the receiving opening being located in the top of the ladle adjacent one end of the ladle, the ladle having a metal discharge nozzle located adjacent the top of the ladle in the end of the ladle opposite the end to which the receiving opening is adjacent, the discharge nozzle extending upwardly and being spaced away from the ladle, the nozzle discharge opening being above the slag line, the nozzle entrance opening being entirely below the metal line, the receiving opening being substantially larger than the metal discharge opening, whereby when the ladle is tilted to its substantially vertical metal discharge position the metal discharge opening is adjacent the lowest portion of the ladle.

2. A slag separating ladle having a wall forming a solid bottom, said ladle mounted for tilting in opposite directions from its normal substantially horizontal position for receiving metal and slag to two substantially vertical opposite positions, in one of which metal is discharged and in the other of which slag is discharged, the top of the ladle being closed except for a receiving opening, the receiving opening being located in the top of the ladle adjacent one side of the ladle, the ladle having a metal discharge nozzle located adjacent the top of the ladle in the side of the ladle opposite the side to which the receiving opening is adjacent, the discharge nozzle extending upwardly and being spaced away from the ladle, the nozzle discharge opening being above the slag line, the nozzle entrance opening being entirely below the metal line, the receiving opening being substantially larger than the metal discharge opening, whereby when the ladle is tilted to its substantially vertical metal discharge position the metal discharge opening is adjacent the lowest portion of the ladle.

3. A slag separating ladle having a wall forming a solid bottom, said ladle mounted for tilting in opposite directions from its normal substantially horizontal position for receiving metal and slag to two substantially vertical opposite positions, in one of which metal is discharged and in the other of which slag is discharged, the ladle when in receiving position having a receiving opening located above the slag line, the ladle also having a metal discharge nozzle located adjacent the top of the ladle and extending upwardly and spaced away from the ladle, the nozzle discharge opening being above the slag line, the nozzle entrance opening being entirely below the metal line.

4. A slag separating ladle having a wall forming a solid bottom, said ladle mounted for tilting in opposite directions from its normal substantially horizontal position for receiving metal and slag to two substantially vertical opposite positions, in one of which metal is discharged and in the other of which slag is discharged, the ladle when in receiving position having a receiving opening located in the top of the ladle and above the slag line, the ladle also having a metal discharge nozzle located adjacent the top of the ladle and extending upwardly and spaced away from the ladle, the nozzle discharge opening being above the slag line, the nozzle entrance opening being entirely below the metal line.

WILLIAM H. LEWIS.

CERTIFICATE OF CORRECTION.

October 10, 1944.

Patent No. 2,360,065.

WILLIAM H. LEWIS.

It is hereby certified that error appears in the printed specification of the above numbered patent requiring correction as follows: Page 1, second column, line 35, before the word "metal" strike out "slag"; and that the said Letters Patent should be read with this correction therein that the same may conform to the record of the case in the Patent Office.

Signed and sealed this 15th day of May, A. D. 1945.

Leslie Frazer

Acting Commissioner of Patents.

(Seal)